US009389631B2

(12) United States Patent
Panosyan et al.

(10) Patent No.: US 9,389,631 B2
(45) Date of Patent: Jul. 12, 2016

(54) SYSTEM AND METHOD FOR REACTIVE POWER COMPENSATION

(75) Inventors: Ara Panosyan, Munich (DE); Daniel Kotzor, Seefeld (DE); Reigh Allen Walling, Clifton Park, NY (US); Johannes Huber, Kramsach (AT)

(73) Assignee: General Electric Company, Niskayuna, NY (US)

( * ) Notice: Subject to any disclaimer, the term of this patent is extended or adjusted under 35 U.S.C. 154(b) by 977 days.

(21) Appl. No.: 13/483,677

(22) Filed: May 30, 2012

(65) Prior Publication Data

US 2013/0320770 A1 Dec. 5, 2013

(51) Int. Cl.
*H02J 1/02* (2006.01)
*G05F 1/70* (2006.01)

(52) U.S. Cl.
CPC ............... *G05F 1/70* (2013.01); *Y10T 307/707* (2015.04)

(58) Field of Classification Search
CPC ........................................................ G05F 1/70
USPC ........................................................ 307/105
See application file for complete search history.

(56) References Cited

U.S. PATENT DOCUMENTS

| | | | | |
|---|---|---|---|---|
| 2004/0024565 | A1* | 2/2004 | Yu | B60G 17/0182 702/151 |
| 2004/0090214 | A1 | 5/2004 | Chou et al. | |
| 2007/0097565 | A1 | 5/2007 | Oohara et al. | |
| 2007/0135970 | A1 | 6/2007 | Zhou et al. | |
| 2009/0001942 | A1 | 1/2009 | Temma et al. | |
| 2009/0299664 | A1* | 12/2009 | Zhang et al. | 702/65 |
| 2010/0067271 | A1* | 3/2010 | Garces et al. | 363/95 |
| 2010/0134076 | A1 | 6/2010 | Cardinal et al. | |

FOREIGN PATENT DOCUMENTS

| | | | |
|---|---|---|---|
| CN | 101207287 | A | 6/2008 |
| CN | 101447759 | A | 6/2009 |
| EP | 1887674 | A1 | 2/2008 |

OTHER PUBLICATIONS

M. Prodanovic et al.; Harmonic and reactive power compensation as ancillary services in inverter-based distributed generation; The Institution of Engineering and Technology 2007; IET Gener. Transm. Distrib., 2007,1, (3), pp. 432-438.

* cited by examiner

*Primary Examiner* — Jared Fureman
*Assistant Examiner* — Duc M Pham
(74) *Attorney, Agent, or Firm* — Ann M. Agosti

(57) ABSTRACT

A reactive power control system is provided. The reactive power control system computes a required value for a reactive power based on a state observer method for at least one electrical element in an electrical system. The reactive power control system also generates a reactive power command based on the required value of the reactive power. The reactive power control system further transmits the reactive power command to the electrical element in the electrical system for generating the required value of reactive power to compensate for a voltage change induced by the respective electrical element in the electrical system.

12 Claims, 4 Drawing Sheets

SYSTEM AND METHOD FOR REACTIVE POWER COMPENSATION

BACKGROUND

The invention relates to a system and method for reactive power compensation in power networks.

Electric power networks are used for transmitting and distributing electricity for various purposes. Electric networks include multiple devices interconnected with each other to generate, transmit, and distribute electricity.

Electrical power networks experience voltage variations during operation that are caused by the variation in generation of the active and the reactive power by different power generating devices and variable consumption of the active and reactive power at different loads in the electrical power network.

Electric power networks to which large amounts of renewable power generation are connected can have large and rapid voltage variations at and around the points of interconnection that lead to excessive operation of voltage regulating devices such as on-load tap changing transformers and capacitors. Due to limited operating speeds of the voltage regulating devices, a constant voltage cannot always be maintained at all the network buses in the power network. Excessive operation of mechanically-switched transformer taps and capacitors leads to increased maintenance and diminished operating life of the switched devices.

One approach for mitigating the voltage variation mentioned above is to provide a closed loop controller, with or without voltage droop characteristics. The controller adjusts the reactive power supply to compensate the voltage variation using mechanically switched reactors and capacitors as well as dynamic devices such as static VAR compensators (SVCs) and static synchronous compensators (STATCOMs). More specifically, in some renewable power generation systems the closed loop controller adjusts the operating power factor of the power converter to adjust the reactive power for mitigating the voltage variation. The closed loop controller, however, may undesirably interact with other voltage controllers in the power network during this process. Furthermore, the closed loop controller tends to compensate for the reactive power demand of the network and connected loads, which leads to increased losses in the reactive power source and sub-optimal utilization of its dynamic capabilities.

An alternative approach for mitigating voltage variations in the power network is to individually compensate the self-induced voltage variation for each of the power generating devices. The amount of reactive power required for compensating a self-induced voltage variation is computed based on an approximate voltage drop equation which results in a constant power factor operation. However, this method tends to be inaccurate under high power conditions and may lead to overcompensation in the electric power network resulting in undesired voltage variations and increased losses.

Another approach is to compute the amount of reactive power based on the exact voltage drop equation which results in a variable power factor operation. However, this method is computationally complex and requires additional data.

Hence, there is a need for an improved system to address the aforementioned issues.

BRIEF DESCRIPTION

In one embodiment, a reactive power control system is provided. The reactive power control system computes a required value for a reactive power based on a state observer method for at least one electrical element in an electrical system. The reactive power control system also generates a reactive power command based on the required value of the reactive power. The reactive power control system further transmits the reactive power command to the electrical element in the electrical system for generating the required value of reactive power to compensate for a voltage change induced by the respective electrical element in the electrical system.

In another embodiment, a solar power generation system is provided. The system includes at least one photovoltaic module for generating DC power. The system also includes at least one power converter for converting DC power to AC power. The system further includes a reactive power control system. The reactive power control system computes a required value for a reactive power based on a state observer method for at least one power converter in the solar power generation system. The reactive power control system also generates a reactive power command based on the required value of the reactive power. The reactive power control system further transmits the reactive power command to the respective power converter in the solar power generation system for generating the required value of reactive power to compensate for a voltage change induced by the respective power converter in the solar power generation system.

In another embodiment, a method including the steps of, computing a required value of a reactive power based on a state observer method for at least one electrical element in an electrical system, generating a reactive power command based on the required value of the reactive power and transmitting the reactive power command to the respective electrical element for generating the required reactive power to compensate for a voltage change induced by the respective electrical element in the electrical system is provided.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a reactive power control system coupled to an electrical element in an electrical system. The respective electrical element induces a voltage change in the electrical system during operation. The change induced by the respective electrical element is compensated by the reactive power control system coupled to the respective electrical element. The reactive power control system computes a required value for a reactive power based on a state observer method for the respective electrical element in the electrical system. The reactive power control system further generates a reactive power command based on the required value of the reactive power. The reactive power command is transmitted by the reactive power control system to the respective electrical element for generating the required value of the reactive power to compensate for the voltage change induced by the respective electrical element in the electrical system.

Figure 1:
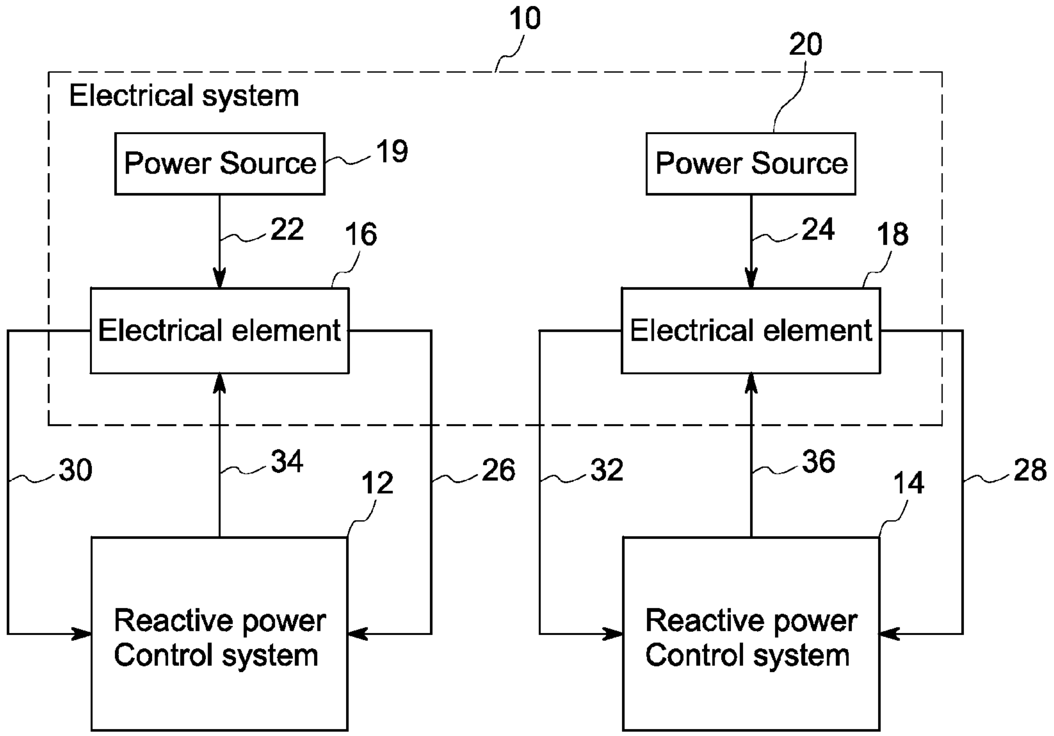
FIG. 1 is an exemplary block diagram representation of a reactive power control system coupled to an electrical system in accordance with an embodiment of the invention.

FIG. 1 is an exemplary block diagram representation of an electrical system 10 comprising reactive power control systems 12, 14 coupled to electrical elements 16, 18 respectively in accordance with an embodiment of the invention. For the purpose of understanding, two electrical elements 16, 18 are provided in the electrical system 10, however N number of electrical elements can be used. Each electrical element 16, 18 is coupled to power sources 19, 20 respectively. Each of the electrical element 16, 18 receives input power 22 and 24 from the power sources 19, 20 respectively. The electrical elements 16, 18 transmit signals such as signals representing voltage 26, 28 for each electrical element 16, 18 and signals representing active power output 30, 32 for each of the electrical element 16, 18 respectively to the respective reactive power control systems 12, 14. During operation, the electrical elements 16, 18 induce a voltage change in the electrical system 10 due to the variation in active power output. The reactive power control systems 12, 14 control the electrical elements 16, 18 to compensate for the voltage changes induced by the respective electrical elements 16, 18. The reactive power control systems 12, 14 further receive the signals representing the active power output 30, 32 and signal representing voltage 26 and 28 of the respective electrical elements 16, 18 and compute a required value of reactive power for compensating the induced voltage changes based on a state observer method. As used herein, "reactive power" and "reactive power control" may refer to direct reactive power and reactive power control (meaning that the reactive "power" is actually calculated or to other reactive parameters and controls such as, for example, reactive current and reactive current control or power factor and power factor control (wherein the reactive power is controlled but not necessarily actually calculated). The reactive power systems 12, 14 further generate a reactive power command 34, 36 based on the required value of the reactive power. The reactive power command 34, 36 is transmitted to the respective electrical elements 16, 18 for generating the required value of the reactive power to compensate for the voltage change induced by the respective electrical element 16, 18 in the electrical system 10. Although two electrical elements and reactive power control systems are shown for purposes of example, the above mentioned approach can be used to compensate the voltage change induced by any number of electrical elements (with respective reactive power control systems) in the electrical system 10.

Figure 2:
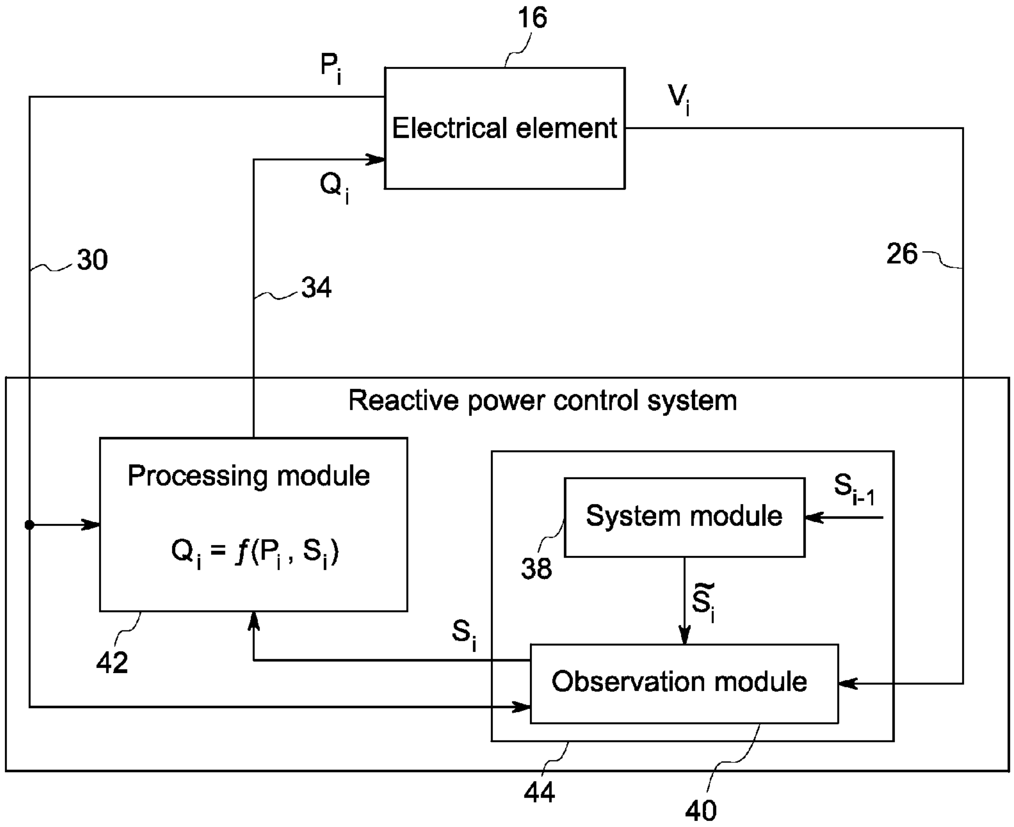
FIG. 2 is a block diagram representation of one reactive power control system coupled to one electrical element of the electrical system in accordance with an embodiment of the invention.

FIG. 2 is a block diagram representation of one reactive power control system 12 coupled to one electrical element 16 of the electrical system 10 for compensating the voltage change induced by the electrical element 16 in the electrical system 10 in accordance with an embodiment of the invention. The electrical element 16 is coupled to the electrical system 10 at the point of interconnection (i), herein after referred to as node (i). The reactive power control system 12 is coupled to the electrical element 16. The reactive power control system 12 uses the signals of actual voltage ($V_i$) 26 at node (i) and the actual active power output $P_i$ 30 at node (i) to calculate the value of reactive power output $Q_i$ at node (i), which is required to compensate for a voltage change induced by the active power output $P_i$ 30 of the electrical element 16. The influence of the active and the reactive power output of the electrical element 16 on the voltage is represented by sensitivity coefficients denoted by $s_i$. The input signals $V_i$ and $P_i$ are used by the state observer 44 to determine the sensitivity coefficients ($s_i$). The sensitivity coefficients are then used as an input of the processing module 42 to calculate the value of reactive power output ($Q_i$), which is required to compensate for a voltage change induced by the active power output of the electrical element 16.

The total voltage change at node (i) is the sum of the variation caused by the active power output $P_i$ and the reactive power output $Q_i$ provided by the electrical element 16 coupled at node (i) represented by $\Delta V_{ii}$, and voltage change induced by the remaining electrical elements (18, FIG. 1) in the electrical system (FIG. 1) denoted by $\Delta V_{irest}$. The total voltage change at node (i) is represented as $\Delta V_i = \Delta V_{i,i} + \Delta V_{i,rest}$.

For understanding of the invention, one example for reactive power compensation for change in voltage induced by the electrical element 16 would be discussed below.

The number and nature of the sensitivity coefficients ($s_i$) depend on the model implemented for the observation module. One example for possible sensitivity coefficients ($s_i$) is the voltage sensitivity coefficient with respect to active power ($\delta Vi/\delta Pi$) and the voltage sensitivity coefficient with respect to reactive power ($\delta V_i/\delta Qi$) at node (i).

The sensitivity coefficients ($s_i$) adopted by the reactive power control system 12 needs to be initialized at the start of the control operations. The sensitivity coefficients ($s_i$) can be initialized by different approaches. One exemplary approach for initializing the voltage sensitivity coefficients is to induce and measure a change in voltage ($\Delta V_i$) at node (i). A change in voltage at node (i) caused by the electrical element 16 can be induced by a change in active power output ($\Delta P_i$) of the electrical element 16 at node (i) and by a change in reactive power ($\Delta Q_i$) the electrical element 16 at node (i). The initial values for the sensitivity coefficients ($\delta V_i/\delta P_i$) and ($\delta V_i/\delta Q_i$) are obtained in two steps in an example embodiment.

In the first step, the active power output ($P_i$) of the electrical element 16 at node (i) is kept unchanged for a predefined interval of time resulting in ($\Delta P_i=0$) and reactive power output ($Q_i$) of the electrical element 16 at node (i) is actively changed by ($\Delta Q_i$). The change in voltage ($\Delta V_i$) at node (i) due to the change in reactive power output ($\Delta Q_i$) is then measured. From the measurement, a first estimate for $\delta V_i/\delta Q_i$ can be obtained as $\delta V_i/\delta Q_i \approx \Delta V_i/\Delta Q_i$.

In the second step, the reactive power output ($Q_i$) of the electrical element 16 at node (i) is kept unchanged for a predefined interval of time resulting in ($\Delta Q_i=0$) and the active power output ($P_i$) of the electrical element 16 at node (i) is actively changed by ($\Delta P_i$). The change in voltage ($\Delta V_i$) at node (i) due to the change in active power output ($\Delta P_i$) is then measured. From the measurement, a first estimate for $\delta Vi/\delta P_i$ can be obtained as $\delta V_i/\delta P_i \approx \Delta V_i/\Delta P_i$. The reactive power control system 12 uses the initial values of $\delta V_i/\delta P_i$ and $\delta V_i/\delta Q_i$ to initialize the control operations for the electrical element 16.

After initialization, the sensitivity coefficients $s_i$ are continuously estimated by the state observer module 44 which in one embodiment comprises an extended Kalman filter. At first, the system module 38 provides a new set of expected sensitivity coefficients $\tilde{s}_\iota$ based on a system model and the last set of sensitivity coefficients $s_{i-1}$. In a second step, $\tilde{s}_\iota$ and the actual value of the active power output $P_i$ 30 is used in the observation module 40 to create an expected value of the voltage $\tilde{V}_\iota$, which is compared to the measured value of the voltage $V_i$ 26. The difference is then used by the observation module to update the sensitivity coefficients $s_i$. The updated sensitivity coefficients $s_i$ are then used by the processing module 42 to calculate the value of reactive power output $Q_i$, which is required to compensate for a voltage change induced by the active power output $P_i$ 30 of the electrical element 16.

In one embodiment, the operation of the reactive power control system 12 is continuous. The sensitivity coefficients $s_{i-1}$ at time instance $t_{i-1}$ are determined as discussed above and based on the last estimate of the sensitivity coefficients $s_{i-1}$, the system module 38 predicts a new set of sensitivity coefficients $\tilde{s}_i$ at actual time $t_i$. Using this prediction, the actual active power $P_i$ and the actual reactive power $Q_i$, the observation module 40 updates the sensitivity coefficients $s_i$. Once updated, the processing module 42 calculates the value of the reactive power $Q_i$ which is required to cancel out the voltage change induced by the active power output $P_i$.

The estimated sensitivity coefficients ($s_i$). are transmitted to the processing module 42 that computes the required value of reactive power for compensating the voltage change induced by the active power output $P_i$ at time $t_i$. The processing module 42 further generates a reactive power command (34, FIG. 1) based on the required value of the reactive power. The processing module 42 transmits the reactive power command to the electrical element 16 for generating the required value of reactive power for compensating the voltage variation induced by the active power output of the electrical element 16 at time $t_i$.

The above mentioned operation is repeated continuously during operation of the electrical system. Although the example was provided for direct reactive power for purposes of example, similar techniques can be applied to other reactive parameters such as reactive current and power factor.

Figure 3:
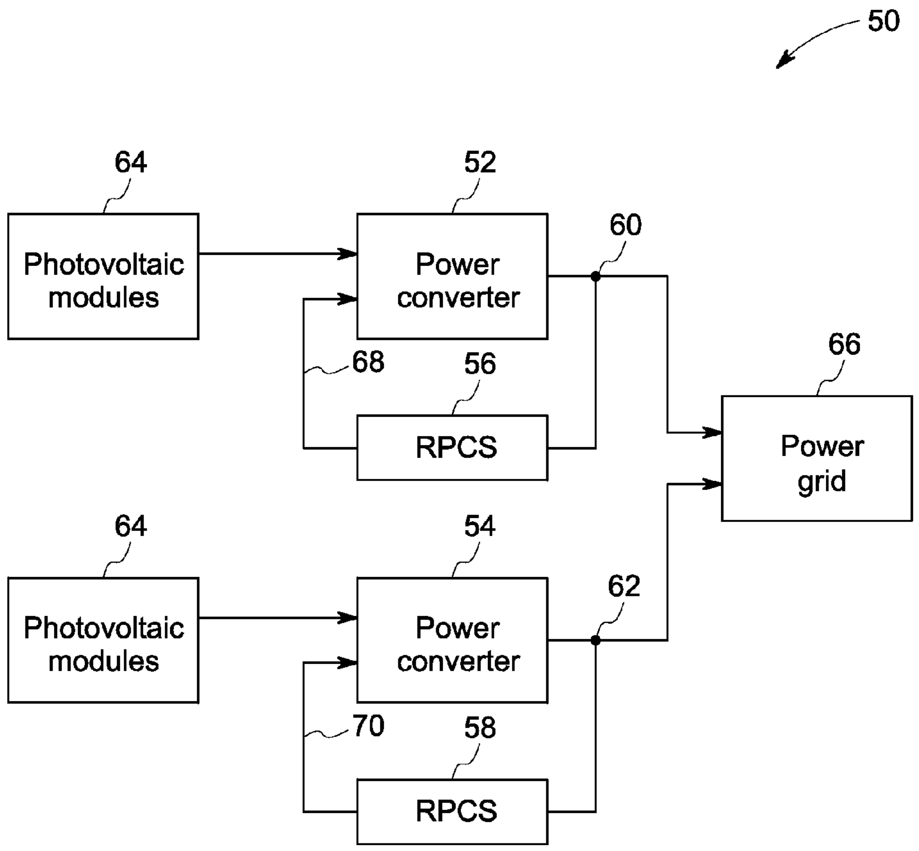
FIG. 3 is a block diagram representation of an exemplary electrical system comprising a solar power generation system including a reactive power control system in accordance with an embodiment of the invention.

FIG. 3 is a block diagram representation of an exemplary solar power generation system 50 including a reactive power control system in accordance with an embodiment of the invention. In one embodiment, the electrical system (FIG. 1) includes the solar power generation system 50 that comprises at least one power converter. In an exemplary embodiment, the solar power generation system 50 includes two power converters 52, 54. Each of the power converters 52, 54 is connected to the electric power grid 66 at the respective point of interconnection 60, 62. The reactive power control system (RPCS) 56, 58 are coupled to the power converters 52, 54 respectively.

The solar power generation system 50 includes photovoltaic modules 64 that generate DC power. Each of the power converters 52, 54 is coupled to some of the photovoltaic modules 64 and converts DC power generated from them to AC power and transmits the AC power to a power grid 66. Each of the power converters 52, 54 induces a variation in voltage at the respective point of interconnection 60, 62 to the electric power grid 66. Each of the reactive power control systems 56, 58 is coupled to the respective power converters 52, 54 for compensating the voltage variation induced by the power output of the respective power converters 52, 54.

The reactive power control system 56, 58 of each of the respective power converters 52, 54 measures a voltage of the AC power at the respective point of interconnections 60, 62. Each of the reactive power control system 56, 58 generates a reactive power command 68, 70 based on the above mentioned state observer method for each of the respective power converters 52, 54 for compensating the individual voltage variations induced by each of the power converters 52, 54. In one embodiment, the reactive power command 68, 70 may include a command to generate the required value of reactive power or reactive current or adjust the power factor of the power converters 52, 54 during operation.

Figure 4:
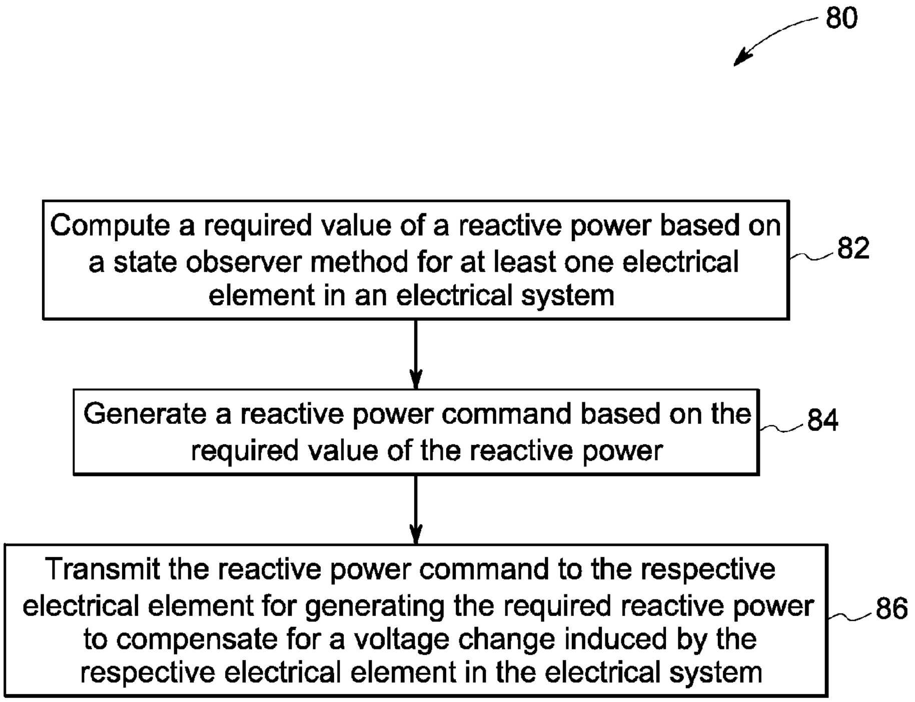
FIG. 4 is a flow chart representing steps involved in a method for reactive power control based on a state observer method in an electrical system in accordance with embodiment of the invention.

FIG. 4 is a flow chart representing steps involved in a method 80 for reactive power compensation based on a state observer method in an electrical system in accordance with an embodiment of the invention. The method 90 includes computing a required value of reactive power based on a state observer method for at least one electrical element in an electrical system in step 82. The method 80 also includes generating a reactive power command based on the required value of the reactive power in step 84. The method 80 further includes transmitting the reactive power command to the respective electrical element for generating the required reactive power to compensate for a voltage change induced by the respective electrical element in the electrical system in step 86.

The various embodiments of the reactive parameter compensation system described above provide a more efficient and reliable electrical system. The system described above reduces voltage variations and increases an overall efficiency of the electrical system.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A reactive power control system for executing steps of:

computing a required value for a reactive power based on a state observer method for at least one electrical element in an electrical system;

generating a reactive power command based on the required value of the reactive power; and transmitting the reactive power command to the electrical element in the electrical system for generating the required value of reactive power to compensate for a voltage change induced by the respective electrical element in the electrical system, wherein the reactive power control system includes a state observer module for executing the step of computing the required value of the reactive power by obtaining voltage and active power signals of the at least one electrical element and using the voltage and active power signals for determining sensitivity coefficients to be used in the state observer module for calculating the required value of the reactive power.

2. The system of claim 1, wherein the reactive power control system comprises a direct reactive power control system, a reactive current control system, or a power factor control system.

3. The system of claim 1, wherein the at least one electrical element comprises a power converter.

4. The system of claim 1, wherein the electrical system comprises a renewable power generation system.

5. The system of claim 1, wherein each electrical element is coupled to a respective reactive power control system.

6. The system of claim 1 wherein the state observer module is further configured for updating the sensitivity coefficients based on a prior set of sensitivity coefficients in addition to the voltage and active power signals.

7. The system of claim 1 wherein the state observer module comprises an extended Kalman filter for updating the sensitivity coefficients.

8. A solar power generation system comprising:

at least one photovoltaic module for generating DC power;

at least one power converter for converting DC power to AC power; and a reactive power control system for executing steps of:

computing a required value for a reactive power based on a state observer method for at least one power converter in the solar power generation system;

generating a reactive power command based on the required value of the reactive power; and transmitting the reactive power command to the respective power converter in the solar power generation system for generating the required value of reactive power to compensate for a voltage change induced by the respective power converter in the solar power generation system, wherein the reactive power control system includes a state observer module for executing the step of computing the required value of the reactive power by obtaining voltage and active power signals of the at least one electrical element and using the voltage and active power signals for determining sensitivity coefficients to be used in the state observer module for calculating the required value of the reactive power.

9. The system of claim 8, wherein the reactive power control system comprises a direct reactive power control system, a reactive current control system, or a power factor control system.

10. The system of claim 8, wherein each power converter is coupled to a respective reactive power control system.

11. The system of claim 8 wherein the state observer module is further configured for updating the sensitivity coefficients based on a prior set of sensitivity coefficients in addition to the voltage and active power signals.

12. The system of claim 8 wherein the state observer module comprises an extended Kalman filter for updating the sensitivity coefficients.

* * * * *